(12) United States Patent
Lawrence et al.

(10) Patent No.: US 8,368,999 B2
(45) Date of Patent: Feb. 5, 2013

(54) ARTICLE USING AN OPTICAL DEVICE

(75) Inventors: Brian Lee Lawrence, Niskayuna, NY (US); John Frederick Graf, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/253,494

(22) Filed: Oct. 5, 2011

(65) Prior Publication Data

US 2012/0033289 A1    Feb. 9, 2012

Related U.S. Application Data

(62) Division of application No. 12/180,781, filed on Jul. 28, 2008.

(60) Provisional application No. 61/033,143, filed on Mar. 3, 2008.

(51) Int. Cl.
*G02F 1/29* (2006.01)
*G02B 5/04* (2006.01)

(52) U.S. Cl. .................................. 359/299; 359/831

(58) Field of Classification Search ................ 359/9, 10
See application file for complete search history.

(56) References Cited

U.S. PATENT DOCUMENTS 5,796,525 A * 8/1998 Dempewolf et al. ......... 359/653
2007/0280626 A1 * 12/2007 Haddock et al. .............. 385/147

* cited by examiner

*Primary Examiner* — Jade R Chwasz
*(74) Attorney, Agent, or Firm* — Joseph J. Christian

(57) ABSTRACT

An article includes an optical device. The optical device includes a first prism, a second prism, and a light source. The first prism includes an optically active material that affects a refractive index of at least a portion of the first prism via a photochemical change induced by exposure to different wavelengths of light from the light source.

30 Claims, 4 Drawing Sheets

ARTICLE USING AN OPTICAL DEVICE

This application is a divisional application off of U.S. patent application Ser. No. 12/180,781, filed Jul. 28, 2008, which is a non-provisional application that claims priority to provisional U.S. Patent Application Ser. No. 61/033,143 filed on Mar. 3, 2008; the disclosure of which is hereby incorporated by reference.

BACKGROUND

1. Technical Field

The invention includes embodiments that may relate to an optical device. The invention includes embodiments that may relate to a method of making or using the optical device.

2. Description of Art

Some devices may perform optical zooming and optical scanning operations. Such devices may need mechanical means with moving parts to optically zoom or scan. Optical zoom, such as that performed by a telescope, microscope, or camera moves two or more co-axial lenses relative to one another. For example, in some devices, increasing distance between lenses increases magnification, while decreasing distance decreases magnification. This technology may be found in rifle/sniper scopes, target acquisition systems, medical imaging equipment, and surveillance systems.

Optical scanning for image production or image reading, such as that performed by a laser printer, fax machine, or barcode reader, is typically accomplished by mirrors mounted on a mechanical scanning device, such as a linear or rotational stage. Optical scanners may be used in such applications as military targeting, tracking, and designing applications, medical applications, and entertainment systems.

Optical device moving parts may be a point of failure. Mechanical fatigue, imprecise machining, and sensitivity to mechanical vibration or physical stimulation may precipitate the failure. It may be desirable to have a device that differs from currently available devices. It may be desirable to have a method of making or using a device that differs from those methods that are currently available.

BRIEF DESCRIPTION

In one embodiment, an article includes an optical device. The optical device includes a first prism and a second prism. The first prism includes an optically active material that responds to an external stimulus that affects a refractive index of at least a portion of the first prism.

BRIEF DESCRIPTION OF DRAWING FIGURES

DETAILED DESCRIPTION

Figure 1:
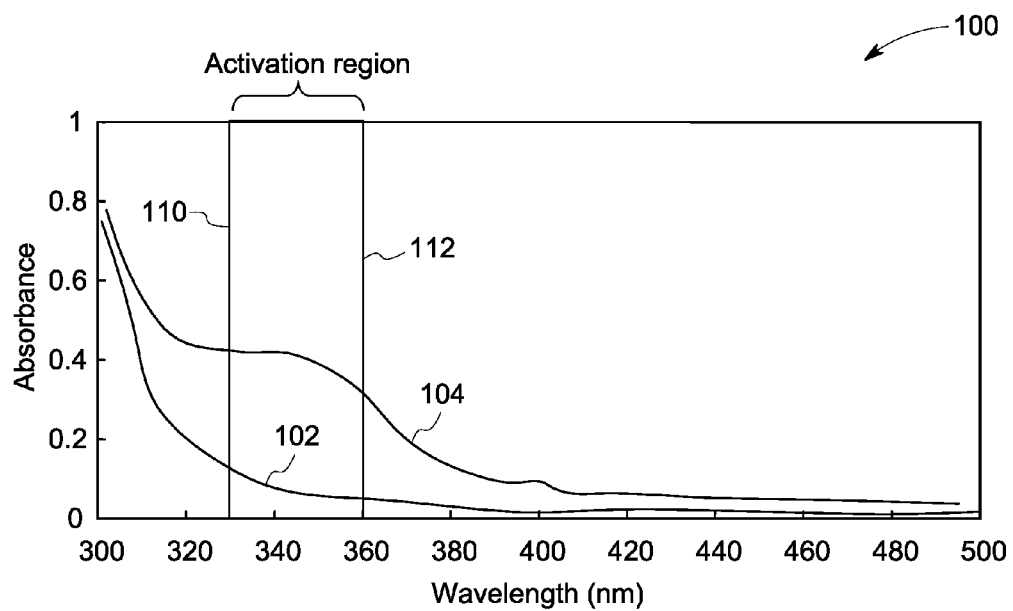
FIG. 1 is a graph showing an absorption change of an optically active material according to an embodiment of the invention.

The invention includes embodiments that may relate to an optical device. The invention includes embodiments that may relate to a method of making or using the optical device.

As used herein, active material refers to a stimulus responsive material having at least one component that has a controllable effect on a refractive index of an article in which it is incorporated. Magnification refers to the ratio of the size of an image to the size of an object or the apparent enlargement or shrinkage of an object by an optical instrument that is the ratio of the dimensions of an image formed by the instrument to the corresponding dimensions of the object. Refractive index refers to the ratio of the speed of light in a vacuum to the speed of light in a medium under consideration. Scanning angle refers to the degree of deviation from an incident beam at a prism boundary. A prism can deviate a path of a light beam by an amount that is based on the wavelength of the light beam, the apex angle of the prism, and the refractive index of the prism material. A lens is an optical device with perfect or approximate axial symmetry which transmits and refracts light, converging or diverging the beam. A lens can deviate a path of a light beam by an amount that is based on the wavelength of the light beam, the axis of the lens determined by the curvature and the focal length of the lens, and the refractive index of the lens material. A photo-product derivative is a reaction product of one or more reactants, where the reaction is initiated or catalyzed by light.

In one embodiment, an article includes an optical device. The optical device includes a first lens and a second lens. The first lens includes an optically active material that responds to an external stimulus that affects a refractive index of at least a portion of the first lens. In one embodiment, there is a change in the refractive index of the first lens. In one embodiment, there is a change in the refractive index of both the first lens and the second lens. In one embodiment, the optical device may be configured for use as a telescope, microscope, light management device, image magnification device, image demagnification device, beam expander, beam contractor, video still capture system, or telephoto system.

In one embodiment, an optical device includes one or more active materials having a response of changing its refractive index with regard to exposure to an external stimulus. The optically active material may be used to create an optical device. The optically active material reversibly changes the refractive index of the lens. Control over the state of the optically active material in turn controls the refractive index of a lens or a prism, which then allows control over the magnification available through the lens and the beam angle available through the prism.

During use, the optical device may be capable of a change in its degree of magnification to greater than about 5 percent. In one embodiment, the optical device may be capable of a change in its degree of magnification to greater than about 150 percent. In one embodiment, the optical device may be capable of a change in its degree of magnification in a range of from about 5 percent to about 75 percent. In one embodiment, the optical device may be capable of a change in its degree of magnification in a range of from about 5 percent to about 10 percent, from about 10 percent to about 15 percent, from about 15 percent to about 20 percent, from about 20 percent to about 25 percent, from about 25 percent to about 30 percent, from about 30 percent to about 35 percent, from about 35 percent to about 50 percent, from about 50 percent to about 70 percent, from about 70 percent to about 75 percent, from about 75 percent to about 90 percent, from about 90 percent to about 100 percent, from about 100 percent to about 110 percent, from about 110 percent to about 120 percent, or from about 120 percent to about 150 percent, or greater.

With reference to production of the lenses, depending on end-use requirements, the lenses may be injection molded, extruded, spin cast, reactively molded, or reactively cast. The optically active material responds to an external stimulus, such as light or electricity, by increasing or decreasing the refractive index of the article formed therefrom (e.g., a lens or prism). The optically active material may be formed using an optically transparent substrate and an optically active component. Suitable optically active materials may include an optically transparent substrate and a refractive index (RI) modifier material. These optically active materials produce a reversible change in the refractive index via photochemical change induced by exposure to different wavelengths of activating light. For example, UV LEDs increase the refractive index up to a maximum level and red LEDs decrease the refractive index down to a minimum level.

Suitable materials for use as the optically transparent substrate may include thermoplastic polymer, a thermosetting polymer, or a combination of a thermoplastic polymer and a thermosetting polymer. Suitable thermoplastic polymer may include one or more of polyacrylates, polymethacrylates, polyesters, polyolefins, polystyrenes, polyesters, polyamides, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyarylene ethers, polyether amides, polyether esters, or a combination comprising at least two of the foregoing. In one embodiment, the thermoplastic polymer is a polycarbonate. In one embodiment, suitable optical active materials include thermoplastics incorporating reversible photochromic dyes.

A suitable thermosetting polymer may include one or more epoxy thermosetting polymer, phenolic thermosetting polymer, polysiloxane thermosetting polymer, polyester thermosetting polymer, polyurethane thermosetting polymer, polyamide thermosetting polymer, polyacrylate thermosetting polymer, polymethacrylate thermosetting polymer, or a combination comprising at least two of the foregoing thermosetting polymers.

Optionally, the lens production may include lamination of the optically active material with an additional optically transparent substrate. In one embodiment, the optically transparent substrate includes a thermoplastic polymer, a thermosetting polymer, or a combination of a thermoplastic polymer and a thermosetting polymer. The thermoplastic polymer and the thermosetting polymer may be selected in a similar manner as discussed for the optically transparent substrate above.

In one embodiment of the system, the first lens is at a fixed distance from the second lens. Alternatively, the first lens may translate relative to the second lens using hydraulic, electronic, or mechanical means, for example. The translation is in addition to the refractive index change to more significantly impact the magnification available.

In one embodiment, the first lens has static, fixed and non-changing dimensions. That is, the first lens, at least, is not a fluid having dynamic shape but is a fixed solid form. Also, the first lens may be free and devoid of a substantial amount of liquid crystals. By substantial amount it is meant that, the amount of liquid crystals is present in an amount sufficient to significantly affect the refractive index of the overall lens.

Referring back to the optically active component used to form the optically active material, the optically active component may include one or more reversible photochromic dyes. A suitable reversible photochromic dye may include an arylethene-containing dye, an anhydride-containing dye, or a nitrogen-containing dye. The reversible photochromic dye may include one or more of vicinal diarylethene, a photoproduct derived from a vicinal diarylethene, nitrone, nitrostilbene, oxaziridine, and a decomposition product derived from oxaziridine. The reversible photochromic dye includes a photochromic cyclic acid anhydride of dialkylidenesuccinic acid, for example, a fulgide.

During use, the reversible photochromic dye may produce a reversible change in the refractive index upon exposure to a determined wavelength of activating light. The mechanism for refractive index change is a conformational change, decomposition, or molecular rearrangement.

In one embodiment, the refractive index of one lens may be increased and the refractive index of the other lens may be decreased, such that the total change in refractive index is the sum of the changes in the two lenses. In one embodiment, the refractive index may be changed by an amount of up to about 0.25. In one embodiment, the refractive index may be changed by an amount in a range of from about 0.1 to about 0.15, from about 0.15 to about 0.2, or from about 0.2 to about 0.25.

The reversible photochromic dye is present in an amount in a range of from about 0.1 weight percent to about 50 weight percent based on a total weight of the optically transparent substrate. In one embodiment, the reversible photochromic dye is present in an amount in a range of from about 0.1 weight percent to about 1 weight percent, from about 1 weight percent to about 5 weight percent, from about 5 weight percent to about 10 weight percent, from about 10 weight percent to about 15 weight percent, from about 15 weight percent to about 25 weight percent, from about 25 weight percent to about 35 weight percent, or from about 35 weight percent to about 50 weight percent, or greater.

In one embodiment, the reversible photochromic dye may be homogeneously distributed throughout the first lens. In one embodiment, the reversible photochromic dye may be distributed in a gradient having a concentration that varies based on the location in the lens. In one embodiment, the reversible photochromic dye may be included in a layer that forms the lens. For example, the reversible photochromic dye layer may be in the middle of a sandwich like structure.

In one embodiment, the second lens, in addition to just the first lens, may include the reversible photochromic dye. Having both lenses with controllable refractive indices may increase the available magnification. In one embodiment, the second lens is spaced from the first lens. In one embodiment, the optical device may include one or more additional cascading lens pairs.

Due to the moldable or extrudable nature of the optically active materials, for example, the dye-doped thermoplastic materials, an optical device can be produced in large quantities and at relatively low cost. In addition, parts can be extruded to achieve arbitrarily large apertures. Parts with large apertures may enable, for example, beam steering applications with beams that may be 1 meter in diameter. The optically active materials may be molded into optical devices that may be used to achieve reversible optical functionality. In one embodiment, the optical device has an aperture size in a range of from about 1 millimeter to about 1 meter.

Another article according to an embodiment of the invention includes an optical device. The optical device includes a first prism and a second prism. The first prism includes an optically active material that responds to an external stimulus that affects a refractive index of at least a portion of the first prism.

The optical device may configured as one or more of an optical scanner, beam steering device, image steering device, printer, copier, medical imaging device, security scanning device, laser range finding device, laser target designator device, laser tracking device, or target acquisition device.

In one embodiment, the optical device may be capable of scanning at a scanning angle in a range of from about −20 to about +20 degrees. In one embodiment, the optical device is capable of a scanning angle in a range of from about −15 to about +15 degrees, or from about −10 to about +10 degrees. In certain embodiments, only the refractive index of one of the two prisms may be changed which may result in asymmetric angular deviations relative to the normal (optical) axis of the cube, for example the optical device may be capable of a scanning angle in a range of from about −10 to about +20 degrees.

The prisms may be produced by methods similar to those disclosed for the lenses, above, and may use similar optically active materials as used for the lenses. In one embodiment, the prisms are injection molded, extruded, spin cast, reactively molded, or reactively cast.

In one embodiment, the optically active material used in the optical device comprising a first prism and a second prism includes an optically transparent substrate and optically active component. The optically transparent substrate and optically active material are similar to that discussed for the first lens and the second lens above. Optionally, the prism production may include lamination of the optically active material with an additional optically transparent substrate. In one embodiment, the optically transparent substrate includes a thermoplastic polymer, a thermosetting polymer, or a combination of a thermoplastic polymer and a thermosetting polymer. The thermoplastic polymer and the thermosetting polymer may be selected in a similar manner as discussed for the optically transparent substrate above.

As discussed above, for the first lens, the first prism also has static, and non-changing dimensions. That is, the first prism, at least, is not a fluid having dynamic shape but is a fixed solid form. Also, the first prism may be free and devoid of a substantial amount of liquid crystals.

Again as discussed above for the lenses, in one embodiment, the refractive index of one prism may be increased and the refractive index of the other prism may be decreased, such that the total change in refractive index is the sum of the changes in the two prisms. In one embodiment, the refractive index may be changed by an amount of up to about 0.25. In one embodiment, the refractive index may be changed by an amount in a range of from about 0.1 to about 0.15, from about 0.15 to about 0.2, or from about 0.2 to about 0.25.

In one embodiment, the reversible photochromic dye may be homogeneously distributed throughout the first prism. In one embodiment, the reversible photochromic dye may be distributed in a gradient having a concentration that varies based on the location in the prism. In one embodiment, the reversible photochromic dye may be included in a layer that forms the prism. For example, the reversible photochromic dye layer may be in the middle of a sandwich-like structure.

In one embodiment, the second prism is bonded to the first prism to form a composite element, such as for example a cube or a rectangular box like structure. The optical device may have an aperture size in a range of from about 10 micrometers to about 10 meters. In one embodiment, the optical device may include one or more additional cascading prism pairs.

With reference to FIG. 1, a graph 100 shows an absorption change of an optically active material according to an embodiment of the invention. The wavelength of light required to stimulate the optical change in this embodiment is indicated. The graph has absorbance versus wavelength of light in nanometers. Curve 102 is absorbance for polycarbonate, and curve 104 is absorbance for an optically active material according to an embodiment of the invention. In one embodiment, the optically active material is an extended film of phenyl-N-isopropyl nitrone dye in a polycarbonate substrate. In one embodiment, the optically active material is a diarylethene in a polycarbonate substrate. An activation region of light of a determined wavelength has a lower bound 110 at about 330 nm, and an upper bound 112 at about 360 nm. The upper and lower bounds define an area in which the dye absorbs light and affects the conformational change to affect the refractive index of the host article.

Figure 2:
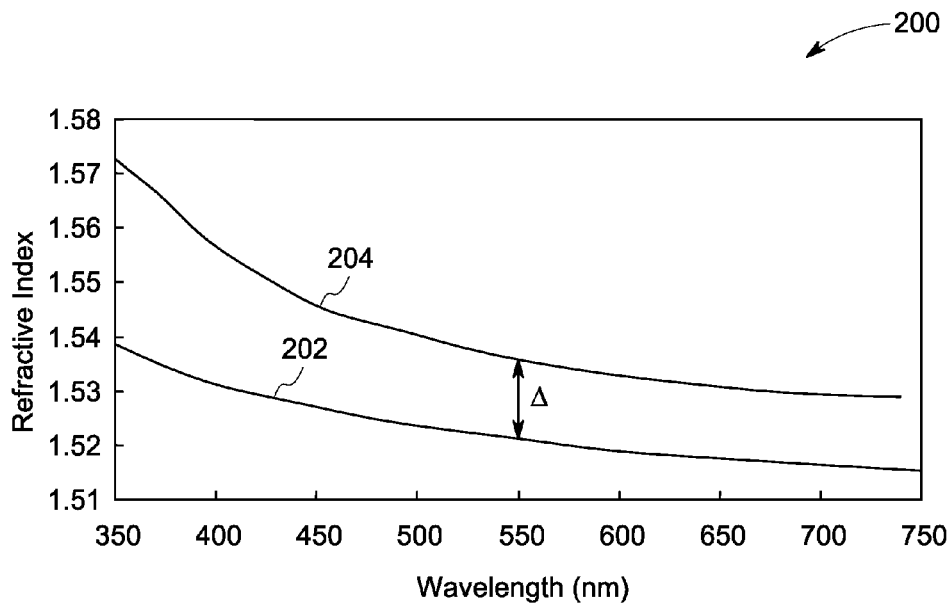
FIG. 2 is a graph showing a span of refractive index change of photochromic dye-doped polymers.

With reference to FIG. 2, a graph 200 shows refractive index of an embodiment of the invention over a range of light wavelengths. Curve 202 shows the refractive index of a material prior to exposure to an external stimulation source; and, curve 204 shows the refractive index of the same material after exposure to the external stimulation source. The material includes 5.2 weight percent of 4-methoxy-2',4'-dinitrostilbene dye in a polycarbonate substrate. In this illustrated embodiment, the external stimulation source is an LED array that provides a determined activation wavelength of light to the optically active material. The distance (A) between the two lines illustrates the capability for refractive index change of the optically active material.

Figure 3:
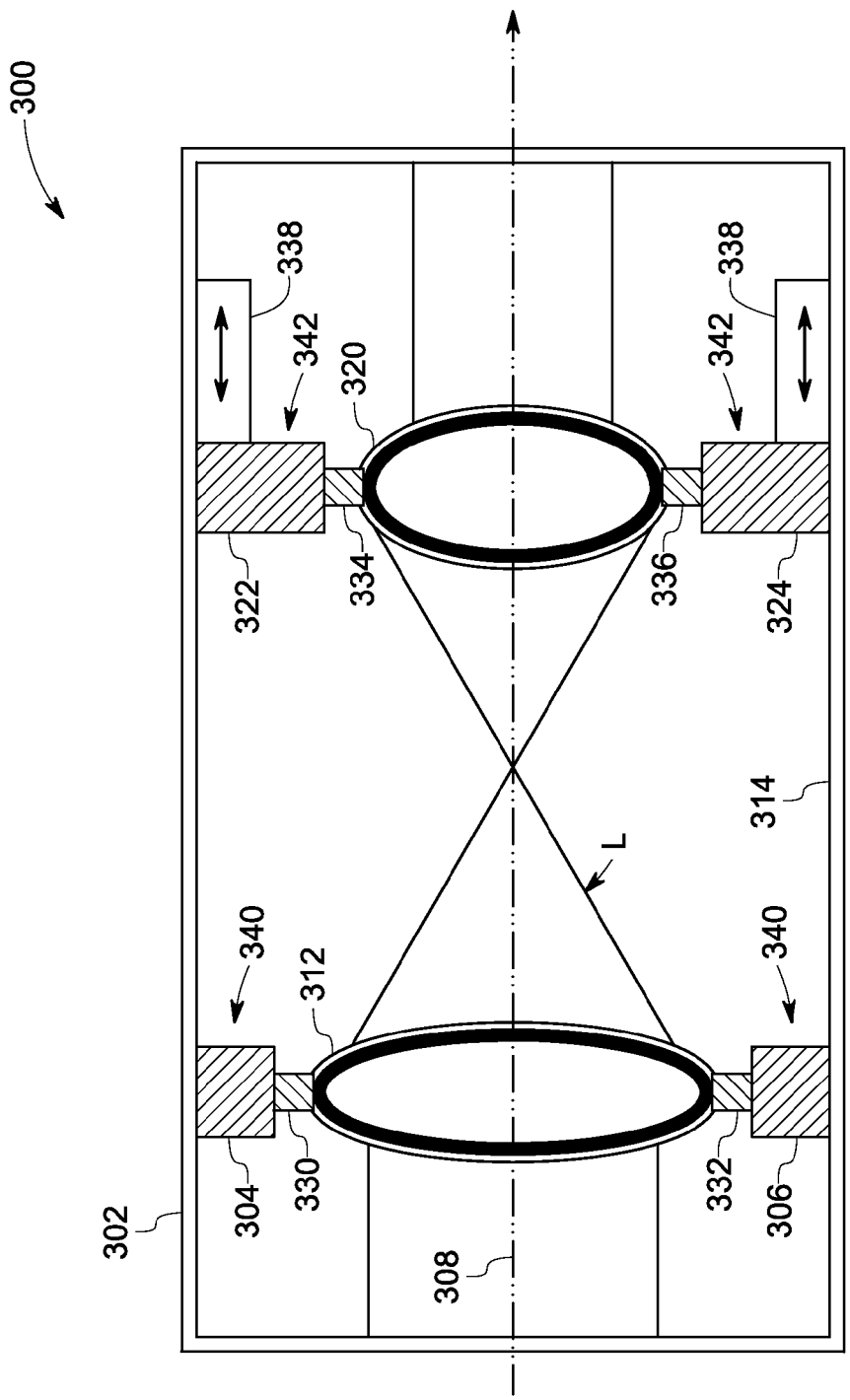
FIG. 3 is an illustration of a single-stage controllable optical zoom device according to an embodiment of the invention.

With reference to FIG. 3, an article 300 that is an optical device comprising an embodiment of the invention is shown. A housing 302 includes a first ring mount 340 used to secure a first lens 312 to an inner surface 314 of the housing 302. A second ring mount 342 is used to secure the second lens 320 to the inner surface of the housing. In the cross-section shown in FIG. 3, the first ring mount appears as a top mount 304 and a bottom mount 306, and the second ring mount appears as a top mount 322 and a bottom mount 324. The housing is cylindrical and defines an axis 308. The first lens is coaxially disposed and fixed by the first mount with respect to the second lens.

The first lens includes optically active material. A first external stimulation source 330 and a second external stimulation source 332 each include an array of light emitting diodes (LEDs). In the illustrated embodiment, two LEDs of one wavelength and two LEDs of another wavelength are arranged in a plane defined by major surfaces of first lens. In a first mode of operation, and when activated by a controller (not shown), the first external stimulation source provides an external stimulus to the first lens fully such that the first lens responds by a change in the characteristics of the optically active material that affects the refractive index of the first lens—referred to as refractive index state R1. In a first mode of operation, and when activated by the controller, the second external stimulation source provides an external stimulus to the first lens fully such that the first lens responds by a change in the characteristics of the optically active material that affects the refractive index of the first lens in a manner different from the manner of response to the first external stimulus—referred to as refractive index state R3. In this embodiment, the refractive index reverts to a state as it was previous to exposure to the first stimulus (e.g., the optically active material "re-sets"). During an optional third mode of operation, the controller activates both the first and the second external stimulation sources and may control their relative brightness to achieve a refractive index of the first lens that is intermediate between the refractive index states R1 and R3—referred to as intermediate refractive index state R2. The direction of a light beam is indicated by an arrow on the axis line, and the light beam itself is indicated by the reference character "L". The LED sources may be mounted in a manner such that they illuminate the lens uniformly. In one embodiment, from about 2 to about 4 LEDs may be used to provide sufficient coverage to illuminate the lens uniformly.

In an alternative embodiment, optionally, the second lens also includes an optically active material. And, if the second lens is optically responsive, the second lens is optically coupled to a third external stimulation source 334 and a fourth external stimulation source 336, each similar to a corresponding source used in conjunction with the first lens. The second lens mount may be, optionally, coupled to a translation device 338. The translation device may move the second lens, axially, so that the distance between the first lens and the second lens may be controlled, while maintaining a coaxial alignment of the first and second lenses.

Figure 4:
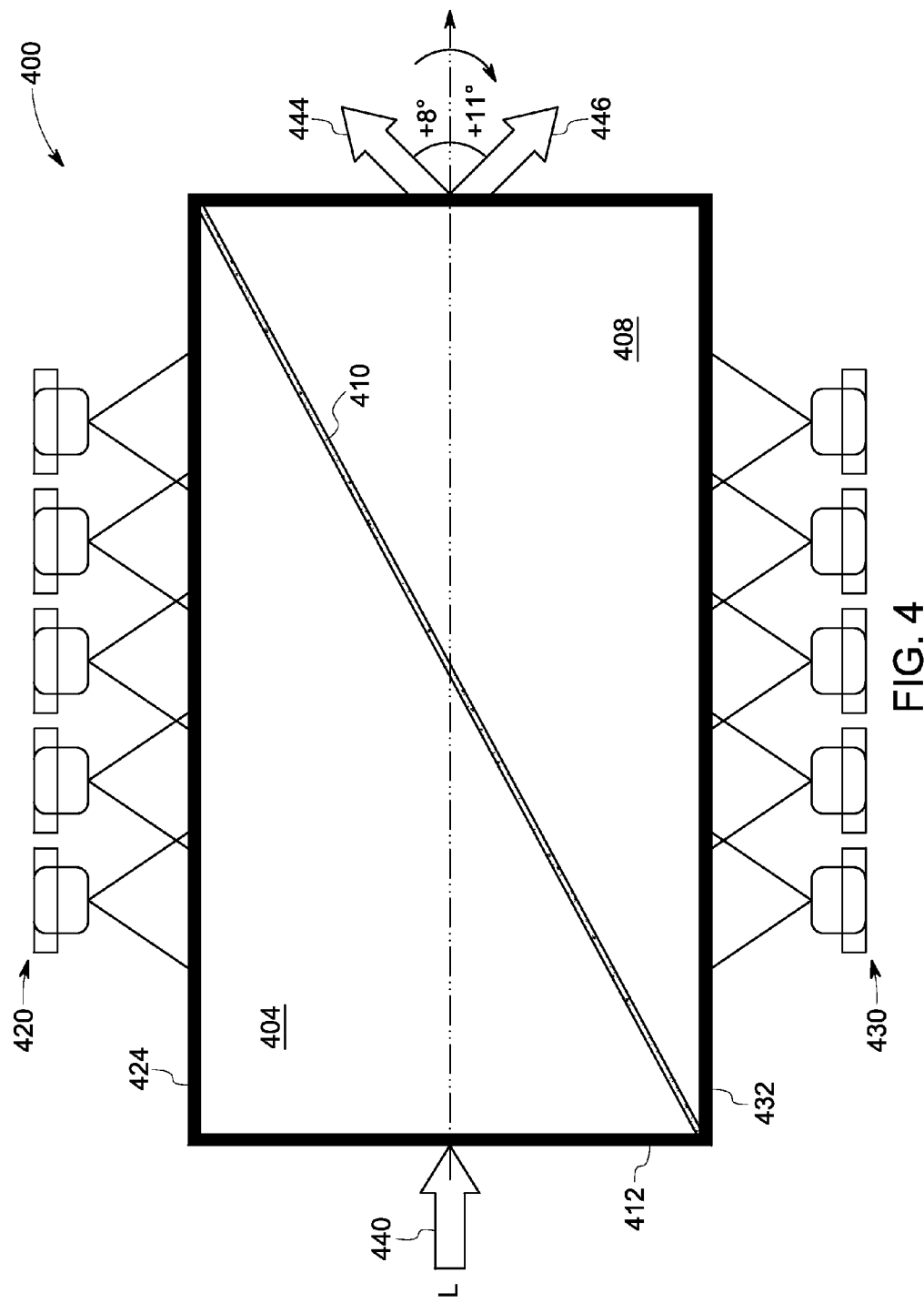
FIG. 4 is an illustration of an optical scanner device according to an embodiment of the invention.

With respect to FIG. 4, an article 400 is schematically shown configured as a scanner. The scanner includes a first prism 404 fixed to a second prism 408. The first prism is secured to the second prism by an optional optical adhesive layer 410. The first prism, second prism and adhesive layer form a prism-prism pair 412.

The first prism contains a first optically active dye, which reversibly affects refractive index, in a thermoplastic substrate. The second prism contains a second optically active dye, which reversibly affects refractive index, in a thermoplastic substrate. The first optically active dye responds to light of a first wavelength to increase the refractive index, and the second optically active dye responds to light of a second wavelength to decrease the refractive index. When exposed to other light of different wavelength, the dyes each respond by changing refractive index in an opposing direction. That is, each prism can have its refractive index increased or decreased, independently of the other prism, depending on the wavelength of light to which the dye is exposed.

A first external stimulation source 420 includes an array of LEDs, some of which emit light at a single defined wavelength and others of which emit light at another single defined wavelength. The LEDs of the array aligned with a top surface 424 of the prism-prism pair. A second external stimulation source 430 includes an array of LEDs, some of which emit light at a single defined wavelength that differs from the wavelength emitted by the LEDs of the first external stimulation source and others of which emit light at a wavelength that differs from any of the foregoing wavelengths. The second external stimulation source is aligned with a bottom surface 432 of the prism-prism pair. Of note is that while both prisms are shown to have controllable refractive indices, a device within the contemplated scope may function with only a single prism that has a controllable refractive index coupled to a prism with a static refractive index. The arrangement allows the refractive index of the first prism and of the second prism to increase or decrease, in a controlled manner, depending on which LEDs of which array are activated.

During use, a controller (not shown) directs a beam of light 440 into the prism-prism pair. The incoming beam of light is of a wavelength that is not absorbed by the dye and does not itself initiate a change in refractive index. Optionally, the controller may calibrate the device by sending a reference beam of a known wavelength and measuring the output of the prism-prism pair.

The controller activates the first external stimulation source to change the refractive index of the first prism to a determined first refractive index (R4) and the refractive index of the second prism to a determined second refractive index (R5). The incoming beam of light exits the prism-prism pair at an angle (+8 degrees) on a first light path 444. The value of the angular swing depends critically on the refractive index change, and +8 degrees is an example for a specific refractive index change. The controller activates the first external stimulation source to change the refractive index of the first prism to a determined first refractive index (R4) and the refractive index of the second prism to a determined second refractive index (R5). The incoming beam of light exits the prism-prism pair at another angle (+11 degrees) on a second light path 446 that differs from the first light path. As mentioned above, the value of the angular swing depends critically on the refractive index change and +11 degrees is an example for a specific refractive index change.

Figure 5:
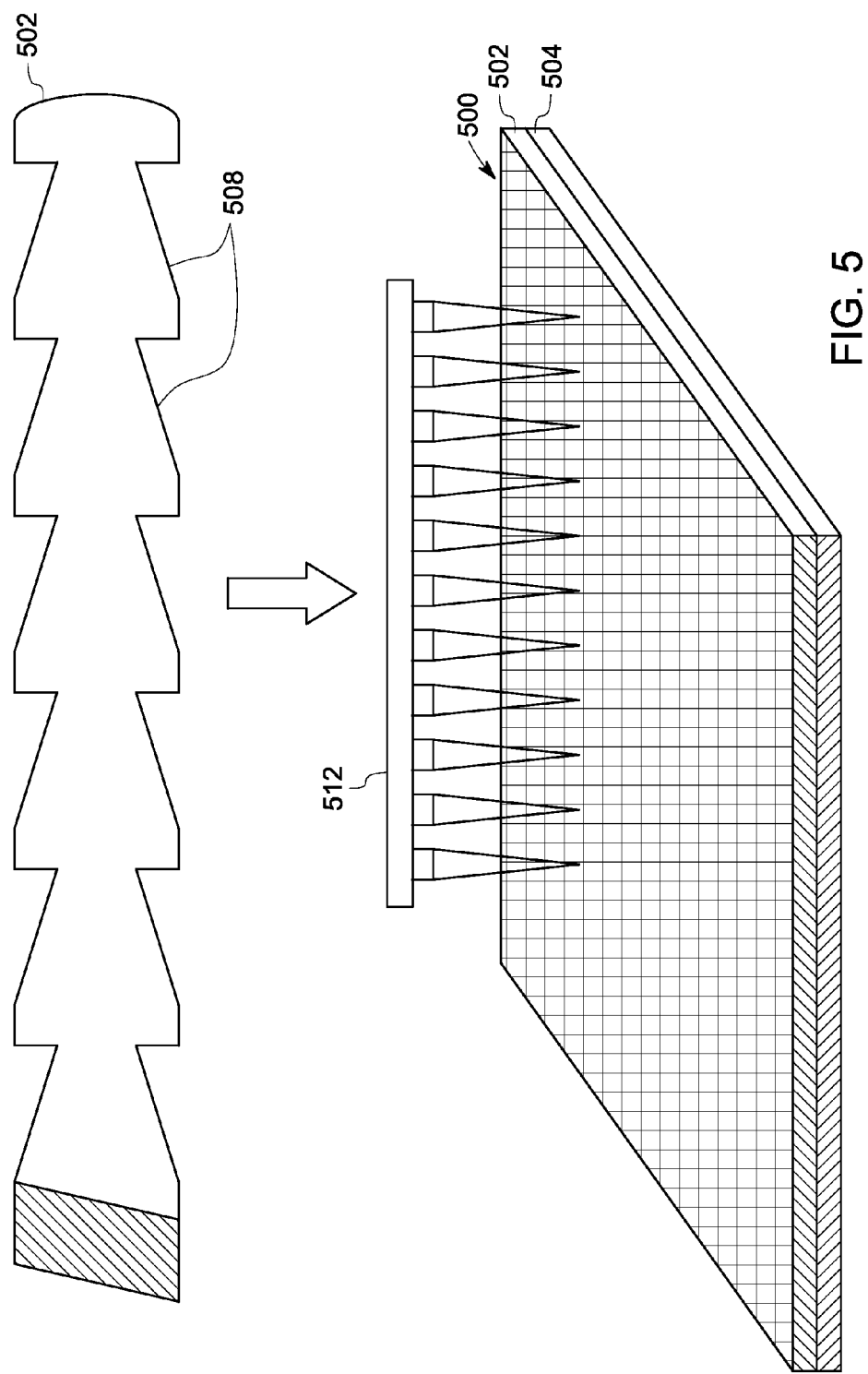
FIG. 5 is an illustration of an optical scanner device according to another embodiment.

With respect to FIG. 5, a manufacturing method for an embodiment of the invention is shown. A large-area scanning sheet 500 containing a first layer 502 and a second layer 504 is shown. The first layer may include an optically active material and may be extruded, pressed, stretched or otherwise formed. The one or more surface of the first layer may be embossed, imprinted, ablated, or calendared such that a prismatic array 508 is embossed into the one or more the surface of the film. The second layer is a fixed index matched film.

An LED array 512 is mounted over the sheet, and a controller (not shown) individually controls the LEDs of the array. Individual elements of the sheet are addressable by discrete ones of the LED array.

EXAMPLES

All chemicals were purchased from Aldrich and used as received unless indicated otherwise. Tetrahydrofuran is purchased from Aldrich as unstabilized and anhydrous grade and further dried and deoxygenated via alumina and $R^{3-15}$ column purification with a set-up from Solv-Tek, Inc. Octafluorocyclopentene was purchased from TCI America and used as received.

Example 1

Optical Zoom

Four variable zoom telescopes are produced, each telescope having a pair of molded lenses. Each lens has a defined curvature and focus length. Only the first lens of the first telescope is composed of a responsive refractive index material. In this example, the responsive refractive index material includes a dye in a plastic substrate. The dye is diarylethene, and the substrate is polycarbonate. In the second telescope, both lenses include the responsive refractive index material.

A third telescope is like the first telescope, except that in the first telescope both lenses in the pair have the same focal length as each other, and in the third telescope the lenses have focal lengths that differ from each other. A fourth telescope is the same as the second telescope, except that in the second telescope both lenses in the pair have the same focal length as each other, and in the fourth telescope the lenses have focal lengths that differ from each other.

The lenses in each of the four telescopes are spaced from each other at a distance determined by the sum of the two focal lengths to provide a corresponding imaging system, for a total of four imaging systems. Short wavelength, long wavelength, and both short and long wavelength light sources are embedded in the imaging systems. In this example the light sources are light emitting diodes (LEDs).

In the second and fourth telescopes, the refractive index of one lens is increased through exposure to UV LEDs, while the refractive index of the other lens decreased through exposure to red LEDs. An intermediate refractive index is possible through illumination with both sets of LEDs. The LEDs are mounted on the inside wall of a housing tube. The tube encloses each telescope in the plane of the lens edges at about 90-degree increments. Each pair of opposing LEDs is of a single wavelength, enabling full exposure of the lens to LED light. In response to exposure to the light, the dye in the substrate affects the RI of the lens.

Correspondingly, the change in the lens' refractive index results in a change in the magnification of the telescope. This is, naturally, without employing the current method of changing the location of the lenses relative to each other. With refractive index changes of +/−0.1, a 30 percent change in magnification is achievable. Additional telescopes are produced using cascading multiple lens pairs to achieve a greater change in magnification/zoom.

For example, consider a telescope consisting of two lenses, an objective lens and an eyepiece lens. The first lens, or the objective lens, is a plano-convex lens in which one surface is flat (planar) and the other surface is spherical with a radius of curvature of 35 millimeters. The lens is fabricated from a modified polycarbonate with a nominal refractive index of 1.58 and with the ability to support a negative refractive index change when exposed to LED radiation at a pre-determined wavelength. The second lens, or the eyepiece lens, is a bi-convex lens in which one surface is spherical with a radius of curvature of 30 millimeter and the other surface is spherical with a radius of curvature of 99 millimeter. The second lens is fabricated from a modified polycarbonate with a nominal refractive index of 1.58 and with the ability to support a positive refractive index change when exposed to LED radiation at a pre-determined wavelength. The lenses are aligned coaxially and spaced 100 mm apart. An object, when viewed, through the lens pair from the eyepiece side will appear magnified by 1.52 times. Upon exposure to the LED radiation the refractive index of the first lens is reduced by 0.051 and the refractive index of the second lens is increased by 0.1. An object, when viewed through the modified lens pair from the eyepiece side will appear magnified by 1.95 times. If the refractive index of the first lens is reduced by 0.084 and the refractive index of the second lens is increased by 0.2 the magnification will increase to 2.37 times.

Example 2

Optical Scanner

An optical scanner is produced that consists of a pair of molded prisms having a common apex angle. One prism of the pair is composed of the optically responsive material. The optically responsive material, in this example, is a thermoplastic substrate of polycarbonate impregnated with a reversible optically active dye of diarylethene. The other prism is composed of thermoplastic material without the dye.

The pair of prisms is bonded together using an optical adhesive to form a cube. A beam of light passing through the cube sees little or no change in angle when the refractive index of the dye-containing prism is approximately equal to the dye-undoped prism.

Two sets of LEDs are arranged on either side of the cube face along the face of the cube. The LED generates wavelength specific light. The LED positioning grants a pathway for transmission of LED-generated light to the prism-prism interface. Upon illumination of the LEDs, the doped material responds by changing the refractive index. The change in refractive index results in the refraction of the beam relative to interfacial plane. The refraction direction depends on the sign of the index change. A single beam scanning prism pair with an index change of +/−0.1 steers a beam +/−10 degrees. This accomplishes a similar task as a mirror mounted on a linear motor, but with no moving parts. Larger angles can be achieved by cascading prism pairs.

For example, consider an optical scanner consisting of two prisms. The first prism has an apex angle of 70 degrees and is fabricated from polycarbonate with a nominal refractive index of 1.58. The second prism also has an apex angle of 70 degrees and is fabricated from a modified polycarbonate with a nominal refractive index of 1.52 and with the ability to support a maximum positive refractive index change of 0.12 when exposed to LED radiation at a pre-determined wavelength. The magnitude of the index change is linearly dependent on the power of the LED radiation. The prisms are assembled such that the hypotenuse surfaces are bonded together to form a cube. A beam traversing the cube, incident through the fixed index prism first would exit the cube at an angle of −11.6 degrees away from the surface normal. Upon exposure to the LED radiation the refractive index of the second prism will begin to increase and the angle of the exiting beam would begin to approach the surface normal. At a power level sufficient to increase the refractive index of the second prism to be equal to that of the first prism, the beam would traverse the cube without deviation. As the refractive index is increased further, the beam will deviate away from the surface normal to a maximum of +8.4 degrees.

Example 3

Forming Optically Reversible Material

An optically reversible material comprising one or more diarylethene is provided. Optically reversible material includes reversible photochromic materials. The diarylethenes change to one molecular orientation (ring-open form) when exposed at one wavelength and change to a different orientation (ring-closed form) when exposed to a second, different wavelength. The two different orientations have different absorptive and refractive properties, and the molecule can change back and forth with repeated exposures. In this example, the molecules do not change orientation when exposed to elevated temperature (thus their thermally irreversible nature). The reaction product includes 1,2-bis(5' (4"methoxyphenyl)-2'-methylthien-3'-yl) perfluorocyclopentene, which may have a quantum efficiency (QE) of >0.5 for the cyclization and a refractive index change ($\Delta n$) of up to 0.04 at 1100 nanometers (nm) wavelength.

The synthesis starts from commercially available 2-methylthiophene, which is brominated in the 3 and 5 position with bromine. The 3,5-dibromo-2-methylthiophene reacts in a Suzuki coupling with 4-(4,4,5,5-tetramethyl-1,3,2-dioxaborolane-2-yl) methoxybenzene, made from 2-isopropoxy-4,4,5,5-tetramethyl-1,3,2-dioxaborolane and 4-bromoanisole in a grignard reaction to obtain 5-(4'-methoxyphenyl)-3-bromo-2-methylthiophene. This compound is reacts with butyl lithium and octafluorocyclopentene to obtain the reaction product. Another example synthesizes 1,2-bis(2-methyl-5-phenyl-3-thienyl) perfluorocyclopentene, while 1,2-bis(5'-(4"-hydroxyphenyl)-2'-methylthien-3'-yl) perfluorocyclopentene is obtained from 1,2-bis(5'(4"methoxyphenyl)-2'-methylthien-3'-yl) perfluorocyclopentene via reaction with BBr3.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An article, comprising:
an optical device comprising a first prism and a second prism; and
a light source;
wherein the first prism comprises an optically active material that affects a refractive index of at least a portion of the first prism via a photochemical change induced by exposure to different wavelengths of light from the light source, wherein the optically active material comprises an optically transparent substrate and an optically active component and wherein the optically active component is a reversible photochromic dye, wherein the reversible photochromic dye is present in an amount in a range of from about 0.1 to about 10 weight percent based on a total weight of the optically transparent substrate.

2. The article as defined in claim 1, wherein the prisms are injection molded, extruded, spin cast, reactively molded, or reactively cast.

3. The article as defined in claim 1, wherein the optically transparent substrate comprises a thermoplastic polymer, a thermosetting polymer, or a combination of a thermoplastic polymer and a thermosetting polymer.

4. The article as defined in claim 3, wherein the thermoplastic polymer is selected from the group consisting of polyacrylates, polymethacrylates, polyesters, polyolefins, polystyrenes, polyesters, polyamides, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyarylene ethers, polyether amides, polyether esters, and a combination comprising at least two of the foregoing.

5. The article as defined in claim 3, wherein the thermoplastic polymer is polycarbonate.

6. The article as defined in claim 3, wherein the thermosetting polymer is selected from the group consisting of an epoxy thermosetting polymer, a phenolic thermosetting polymer, a polysiloxane thermosetting polymer, a polyester thermosetting polymer, a polyurethane thermosetting polymer, a polyamide thermosetting polymer, a polyacrylate thermosetting polymer, a polymethacrylate thermosetting polymer, and a combination comprising at least two of the foregoing thermosetting polymers.

7. The article as defined in claim 1, wherein the reversible photochromic dye is an arylethene-containing dye, anhydride-containing dye, or a nitrogen-containing dye.

8. The article as defined in claim 1, wherein the reversible photochromic dye selected from the group consisting of vicinal diarylethene, a photo-product derived from a vicinal diarylethene, nitrone, nitrostilbene, oxaziridine, and a decomposition product derived from oxaziridine.

9. The article as defined in claim 1, wherein the reversible photochromic dye comprises a photochromic cyclic acid anhydride of dialkylidenesuccinic acid.

10. The article as defined in claim 1, wherein the reversible photochromic dye is capable of producing a reversible change in the refractive index upon exposure to a determined wavelength of activating light.

11. The article as defined in claim 10, wherein the mechanism for change in the refractive index is a conformational change, a decomposition, or a molecular rearrangement.

12. The article as defined in claim 1, wherein the optically active material further comprises a laminate comprising an optically transparent substrate.

13. The article as defined in claim 12, wherein the optically transparent substrate comprises a thermoplastic material, a thermosetting material, or a combination of a thermoplastic material and a thermosetting material.

14. The article as defined in claim 1, wherein during use the refractive index of one prism is increased and the refractive index of the other prism is decreased, such that the total change in refractive index is the sum of the changes in the two prisms.

15. The article as defined in claim 14, wherein the refractive index changes by an amount of up to about 0.25.

16. The article as defined in claim 1, wherein the first prism is at a fixed distance from the second prism.

17. The article as defined in claim 1, wherein the first prism has static, stable, and non-changing dimensions.

18. The article as defined in claim 1, wherein the first prism is entirely free of liquid crystals.

19. The article as defined in claim 1, wherein the second prism is bonded to the first prism to form a composite element.

20. The article as defined in claim 1, wherein the second prism comprises an optically transparent substrate and an optically active component.

21. The article as defined in claim 20, wherein the optically transparent substrate comprises a thermoplastic material, a thermosetting polymer, or a combination of a thermoplastic material and a thermosetting material.

22. The article as defined in claim 20, wherein the optically active component comprises a reversible photochromic dye.

23. The article as defined in claim 1, wherein the optical device has an aperture size in a range of from about 10 micrometers to about 10 meters.

24. The article as defined in claim 1, further comprising additional cascading prism pairs.

25. An article, comprising:
   an optical device comprising a first prism and a second prism; and
   a light source;
   wherein the first prism comprises an optically active material that affects a refractive index of at least a portion of the first prism via a photochemical change induced by exposure to different wavelengths of light from the light source, wherein the optically active material comprises an optically transparent substrate and an optically active component and wherein the optically active component is a reversible photochromic dye, wherein the reversible photochromic dye is homogeneously distributed throughout the first prism.

26. The article as defined in claim 25, wherein the reversible photochromic dye is an arylethene-containing dye, anhydride-containing dye, or a nitrogen-containing dye.

27. The article as defined in claim 25, wherein the reversible photochromic dye selected from the group consisting of vicinal diarylethene, a photo-product derived from a vicinal diarylethene, nitrone, nitrostilbene, oxaziridine, and a decomposition product derived from oxaziridine.

28. The article as defined in claim 25, wherein the reversible photochromic dye comprises a photochromic cyclic acid anhydride of dialkylidenesuccinic acid.

29. The article as defined in claim 25, wherein the reversible photochromic dye is capable of producing a reversible change in the refractive index upon exposure to a determined wavelength of activating light.

30. The article as defined in claim 29, wherein the mechanism for change in the refractive index is a conformational change, a decomposition, or a molecular rearrangement.

* * * * *